(12) United States Patent
Yuzuriha et al.

(10) Patent No.: US 12,146,766 B2
(45) Date of Patent: Nov. 19, 2024

(54) CAMERA DEVICE AND CAMERA ANGLE SHIFT NOTIFICATION METHOD

(71) Applicant: PANASONIC I-PRO SENSING SOLUTIONS CO., LTD., Fukuoka (JP)

(72) Inventors: Takashi Yuzuriha, Fukuoka (JP); Toshiyuki Kihara, Fukuoka (JP); Tsutomu Onoue, Fukuoka (JP); Shugo Yamamiya, Fukuoka (JP); Toshiaki Ito, Fukuoka (JP); Takehito Katori, Tokyo (JP)

(73) Assignee: I-PRO CO., LTD., Tokyo (JP)

( * ) Notice: Subject to any disclaimer, the term of this patent is extended or adjusted under 35 U.S.C. 154(b) by 383 days.

(21) Appl. No.: 17/685,968

(22) Filed: Mar. 3, 2022

(65) Prior Publication Data

US 2022/0282968 A1 Sep. 8, 2022

(30) Foreign Application Priority Data

Mar. 5, 2021 (JP) .................................. 2021-035580

(51) Int. Cl.
*G01C 9/02* (2006.01)
*H04N 23/51* (2023.01)
(Continued)

(52) U.S. Cl.
CPC ............... *G01C 9/02* (2013.01); *H04N 23/51* (2023.01); *H04N 23/55* (2023.01); *H04N 23/56* (2023.01)

(58) Field of Classification Search
CPC .................................. G01C 9/06; H04N 23/56
(Continued)

(56) References Cited

U.S. PATENT DOCUMENTS 5,313,713 A * 5/1994 Heger ..................... G01C 9/06
33/343
8,803,763 B2 * 8/2014 Tokumura ................ G09G 3/36
348/51
(Continued)

FOREIGN PATENT DOCUMENTS

JP H04-145425 A 5/1992
JP 2011-166444 A 8/2011
(Continued)

OTHER PUBLICATIONS

Notice of Reasons for Refusal issued in family member Japanese Application No. 2021-035580 issued on Aug. 20, 2024, together with an English translation.

*Primary Examiner* — George B Bennett
(74) *Attorney, Agent, or Firm* — GREENBLUM & BERNSTEIN, P.L.C.

(57) ABSTRACT

A camera device includes an inclination sensor that is configured to repeatedly detect an inclination of a camera housing, a memory that stores, as an initial value, a detection value of the inclination at the time of installation of the camera housing, a plurality of light emitting elements that is provided on a front surface of the camera housing, and a processor that is configured to control driving of the plurality of light emitting elements. The processor is configured to drive and control the plurality of light emitting elements in different light emission patterns according to a difference between the detection value of the inclination of the camera housing and the initial value.

8 Claims, 14 Drawing Sheets

(51) Int. Cl.
*H04N 23/55* (2023.01)
*H04N 23/56* (2023.01)

(58) Field of Classification Search
USPC .......................................... 33/266, 301, 534
See application file for complete search history.

(56) References Cited

U.S. PATENT DOCUMENTS

| | | | |
|---|---|---|---|
| 9,285,460 B2* | 3/2016 | Haglund | G01C 21/20 |
| 10,591,806 B2* | 3/2020 | Tiefenbrunn | G01C 9/04 |
| 11,117,529 B2* | 9/2021 | Kobayashi | G06V 40/161 |
| 2017/0168376 A1 | 6/2017 | Adervall et al. | |
| 2022/0003545 A1* | 1/2022 | Honoki | G08C 17/02 |
| 2022/0229182 A1* | 7/2022 | Ohtomo | G01C 15/008 |

FOREIGN PATENT DOCUMENTS

| | | | |
|---|---|---|---|
| JP | 2013-025583 A | 2/2013 | |
| JP | 2017-143508 A | 8/2017 | |

* cited by examiner

FIG. 6

| LARGE SHIFT | SHIFT OCCURS | SMALL SHIFT | NORMAL |
|---|---|---|---|
| RED LIGHTING | RED BLINKING | GREEN BLINKING | GREEN LIGHTING |

CAMERA DEVICE AND CAMERA ANGLE SHIFT NOTIFICATION METHOD

CROSS-REFERENCE TO RELATED APPLICATIONS

This application is based on and claims priority under 35 USC 119 from Japanese Patent Application No. 2021-035580 filed on Mar. 5, 2021, the contents of which are incorporated herein by reference.

TECHNICAL FIELD

The present disclosure relates to a camera device and a camera angle shift notification method.

BACKGROUND ART

In the related art, there has been known a vehicle monitoring device capable of easily performing installation and position adjustment after installation (for example, see Patent Literature 1). The vehicle monitoring device captures an image of a traveling vehicle with a monitoring camera, analyzes the captured image, and acquires a registration number or a vehicle color of the vehicle. The vehicle monitoring device includes an image processing device including an inclination detection unit that detects an edge of an image and detects an inclination of a monitoring camera from the inclination of the edge, and a visual field width detection unit that recognizes a width of a license plate in the image and detects a visual field width of the camera based on the recognized width and the width of the image. The image processing device determines whether the inclination of the monitoring camera and a distance between the camera and a monitoring target vehicle position are appropriate based on the detected inclination and visual field width of the monitoring camera, and displays information indicating an adjustment direction on a display device when it is determined that the inclination of the monitoring camera and the distance between the camera and the monitoring target vehicle position are inappropriate.

CITATION LIST

Patent Literature

Patent Literature 1: JP-2013-25583-A

However, it is assumed that the vehicle monitoring device of Patent Literature 1 captures an image while being fixed at a side of a road on which the vehicle travels, and it is not considered that a camera angle collapses (in other words, a camera angle shifts from the camera angle at the time of setting) in the middle of capturing an image. Here, it is assumed that the camera angle collapses in the middle of capturing an image. In the configuration of Patent Literature 1, when an imaging region is not appropriate, a video in which a position adjustment method for avoiding an abnormality is added to the captured image captured by the monitoring camera is displayed on the display unit. Therefore, an operator needs to alternately perform visual recognition of the display unit and the position adjustment of the monitoring camera, and thus it takes time to perform the work. In addition, when the monitoring camera and the display unit are separated from each other, it is necessary for at least two persons to perform the work, and it takes much time.

SUMMARY OF INVENTION

The present disclosure has been made in view of the above-described situation in the related art, and an object of the present disclosure is to provide a camera device and a camera angle shift notification method capable of realizing early detection of shift by an operator and reduction in time of camera angle adjustment even in a case where the camera device is placed in an environment in which a camera angle for imaging is easily shifted from the time of installation.

The present disclosure provides a camera device including an inclination sensor that is configured to repeatedly detect an inclination of a camera housing, a memory that stores, as an initial value, a detection value of the inclination at the time of installation of the camera housing, a plurality of light emitting elements that is provided on a front surface of the camera housing, and a processor that is configured to control driving of the plurality of light emitting elements. The processor is configured to drive and control the plurality of light emitting elements in different light emission patterns according to a difference between the detection value of the inclination of the camera housing and the initial value.

Further, the present disclosure provides a camera angle shift notification method including executing the camera angle shift notification method by a camera device including an inclination sensor that repeatedly detects an inclination of a camera housing, storing, as an initial value, a detection value of the inclination at the time of installation of the camera housing into a memory, calculating a difference between the detection value of the inclination of the camera housing and the initial value, and driving and controlling a plurality of light emitting elements provided on a front surface of the camera housing in different light emission patterns according to the difference.

According to the present disclosure, even in a case where a camera device is placed in an environment in which a camera angle for imaging is easily shifted from the time of installation, it is possible to realize early detection of shift by an operator and reduction in the time of camera angle adjustment.

BRIEF DESCRIPTION OF DRAWINGS

FIG. 6 is an explanatory diagram showing an example of a light emission pattern of a plurality of LEDs.

DESCRIPTION OF EMBODIMENTS

Hereinafter, embodiments specifically disclosing a camera device and a camera angle shift notification method according to the present disclosure will be described in detail with reference to the drawings as appropriate. However, detailed descriptions more than necessary may be omitted. For example, detailed description of a well-known matter or repeated description of substantially the same configuration may be omitted. This is to avoid unnecessary redundancy in the following description and to facilitate understanding of those skilled in the art. The accompanying drawings and the following description are provided in order for those skilled in the art to fully understand the present disclosure, and are not intended to limit the subject matters described in the claims.

Figure 1:
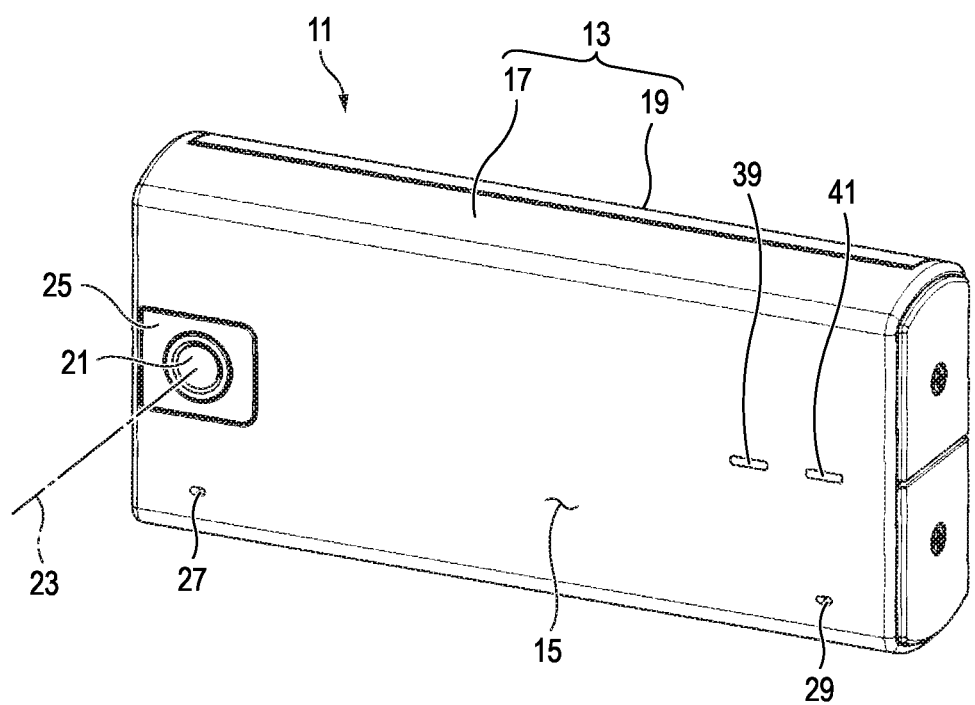
FIG. 1 is an external perspective view of a camera device according to a first embodiment.

FIG. 1 is an external perspective view of a camera device 11 according to a first embodiment. The camera device 11 according to the first embodiment is, for example, a monitoring camera disposed so as to include an area of an imaging target within a camera angle, and is formed in a plate shape in which a front surface 15 of a camera housing 13 has a rectangular shape. In the camera housing 13, a front housing 17 on a front surface side in a thickness direction and a rear housing 19 on a back surface side in the thickness direction are combined. The camera device 11 is a so-called compact camera that does not require a large installation space. In the camera device 11, dimensions of the camera housing 13 are, for example, about 76 mm in width, about 48 mm in height, and about 21 mm in thickness. It is needless to say that the dimensions of the camera housing 13 are not limited to the dimensions described above.

The camera device 11 is formed so as to be compact in a front view by cutting a front edge and a rear edge of the upper and lower surfaces of the camera housing 13 in a horizontally long posture. The camera device 11 has an extruded shape in a horizontal direction that makes it difficult to sense an orientation of the camera. A lens portion 21 is disposed such that an optical axis 23 is offset with respect to an intersection of a pair of diagonal lines formed from points of four corners of the front surface 15. In the first embodiment, the lens portion 21 is disposed close to a central portion of one short side on the front surface 15. The optical axis 23 of the lens portion 21 is perpendicular to the front surface 15. The lens portion 21 is disposed inside a black frame 25 that hides a circle that is easily recognized as a camera.

In the camera device 11, a plurality of light emitting elements (for example, LED: light emission diode) are disposed on the front surface 15 of the camera housing 13 so as to be visible. In addition, on the front surface 15 of the camera housing 13, a pair of a first microphone 27 and a second microphone 29 are disposed close to each other on the left and right sides of one long side.

Figure 2:
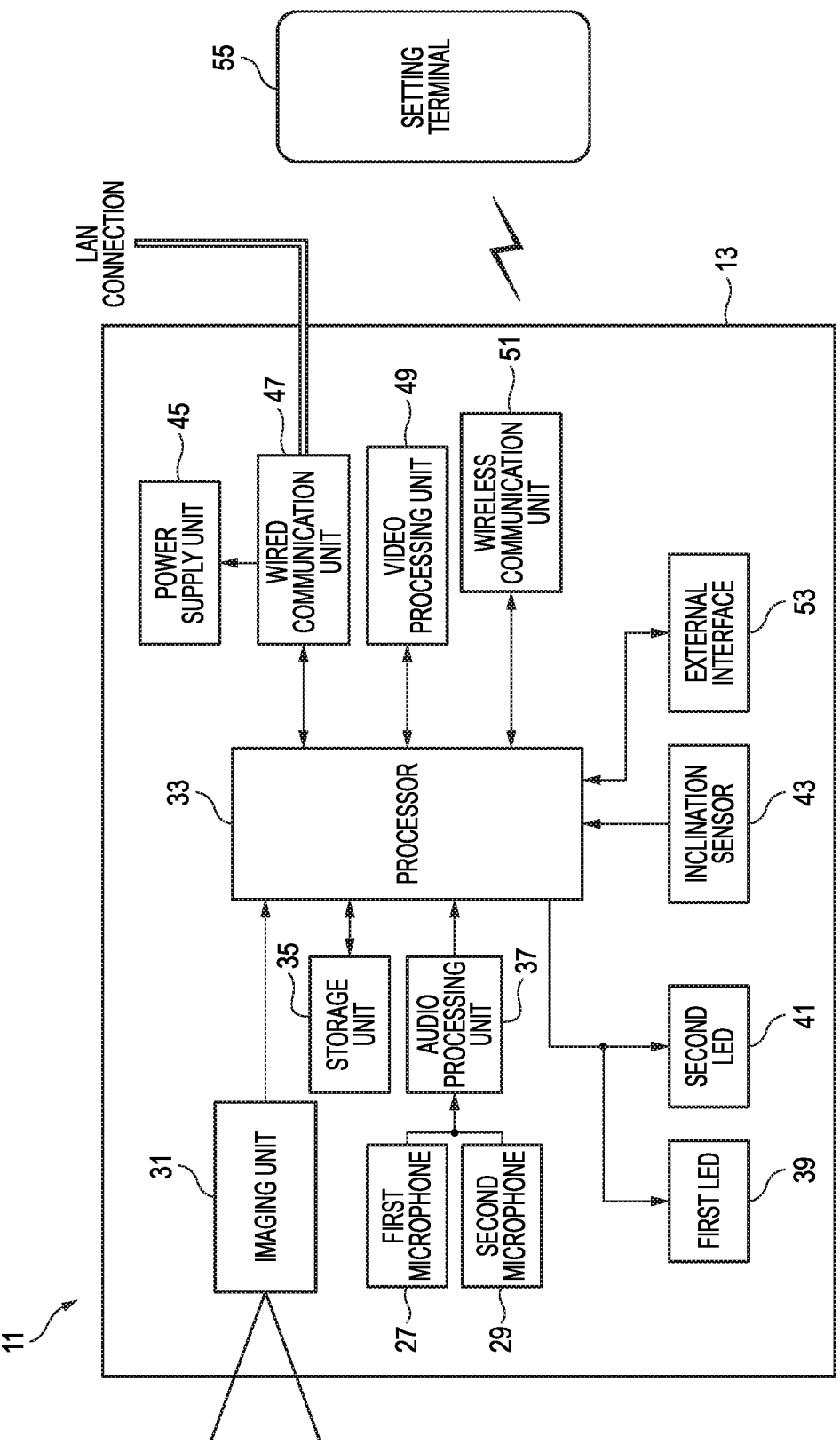
FIG. 2 is a block diagram showing a hardware configuration example of the camera device shown in FIG. 1.

FIG. 2 is a block diagram showing a hardware configuration example of the camera device 11 shown in FIG. 1. The camera device 11 includes an imaging unit 31, a processor 33, a storage unit 35, the first microphone 27 and the second microphone 29, an audio processing unit 37, a first LED 39 and a second LED 41, an inclination sensor 43, a power supply unit 45, a wired communication unit 47, a video processing unit 49, a wireless communication unit 51, and an external interface 53. The number of microphones and LEDs provided in the camera device 11 is not limited to two, and may be three or more.

The imaging unit 31 includes at least the lens portion 21 as an optical element and an image sensor (not shown). The lens portion 21 receives light reflected by an object from a camera angle of the area of the imaging target, and forms an optical image of the object on a light receiving surface (in other words, an imaging surface) of the image sensor. The image sensor is, for example, a solid-state imaging sensor such as a charged coupled device (CCD) or a complementary metal oxide semiconductor (CMOS). The image sensor converts the optical image formed on the imaging surface through the lens portion 21 into an electrical signal for each predetermined time (for example, 1/30 (seconds)), and transmits the electrical signal to the processor 33. For example, when the predetermined time is 1/30 (seconds), a frame rate of the camera device 11 is 30 fps. In addition, the imaging unit 31 may generate image data (video data) by performing predetermined signal processing on the electrical signal at each predetermined time described above. The processing of generating the image data (video data) may be executed by the processor 33. The imaging unit 31 outputs the image data (video data) to the processor 33.

The processor 33 is configured using, for example, a central processing unit (CPU), a digital signal processor (DSP), a graphical processing unit (GPU), or a field-programmable gate array (FPGA). The processor 33 functions as a controller that governs the overall operation of the camera device 11, and performs control processing for governing the operation of each unit of the camera device 11, data input and output processing among units of the camera device 11, data calculation processing, and data storage processing. The processor 33 operates in accordance with a program stored in the storage unit 35. The processor 33 uses the storage unit 35 during operation, and temporarily stores data generated or acquired by the processor 33 into the storage unit 35. For example, the processor 33 performs storage processing of video data from the imaging unit 31, storage processing of audio data from each of the first microphone 27 and the second microphone 29, drive control of the first LED 39 and the second LED 41, storage processing of a detection value (for example, displacement information of a pitch and a roll) of the inclination sensor 43, and the like. In addition, the processor 33 can read a learned model acquired in advance by learning processing from the storage unit 35 and execute processing (for example, detection processing of a person or a face thereof in image data) by artificial intelligence (AI). The processing performed by the AI is not limited to the above-described detection processing of a person or a face thereof. Further, the processing performed by the artificial intelligence described above may be executed not by the processor 33 but by the video processing unit 49.

The storage unit 35 is configured using, for example, a random access memory (RAM) and a read only memory (ROM), and temporarily holds a program necessary for executing the operation of the camera device 11, and further, data generated during the operation. The RAM is, for example, a work memory used during the operation of the camera device 11. The ROM stores in advance and holds, for example, a program for controlling the camera device 11. In other words, the processor 33 can execute various types of processing (steps) related to the camera angle shift notification method according to the present disclosure in the camera device 11, which is a computer, by executing the program stored in the ROM. For example, the storage unit 35 may temporarily store the image data captured by the imaging unit 31. In addition, the storage unit 35 may further include a flash memory in addition to the RAM and the ROM, and may store the image data (video data). In addition, the storage unit 35 stores data of the learned model for AI processing that can be executed by the processor 33 or the video processing unit 49.

In addition, the storage unit 35 may or may not temporarily store the image data (video data), the audio data, and the detection value (for example, the displacement information of the pitch and the roll) of the inclination sensor 43. In the first embodiment, the storage unit 35 may temporarily store an initial value DataX (refer to the following description) indicating the detection value of the inclination sensor 43 when the camera device 11 is installed. In addition, the storage unit 35 may temporarily store a detection value DataY repeatedly detected by the inclination sensor 43 during the operation after the camera device 11 is installed. In addition, the storage unit 35 may temporarily store a difference DiffA between the initial value DataX and the detection value DataY. Further, the storage unit 35 stores threshold values (for example, a first threshold value A, a second threshold value B, and a third threshold value C) of the inclination that sequentially increases.

Each of the first microphone 27 and the second microphone 29 converts a sound wave generated around the camera device 11 into an electric signal and transmits the electric signal to the audio processing unit 37. For example, an ECM microphone (electret condenser microphone) is used as each of the first microphone 27 and the second microphone 29.

The audio processing unit 37 is configured using a signal circuit that performs existing signal processing such as AD conversion on an electric signal of sound collected by each of the first microphone 27 and the second microphone 29. The audio processing unit 37 generates audio data through the signal processing described above. The audio processing unit 37 transmits the generated audio data to the processor 33. The transmitted audio data is stored in the storage unit 35 via the processor 33.

Each of the first LED 39 and the second LED 41 as an example of a light emitting element is a light emitting device provided on the front surface of the camera housing 13. Accordingly, an operator (refer to the following description) can visually grasp an emission color when at least one of the first LED 39 and the second LED 41 emits light. In the first embodiment, for example, the first LED 39 emits green light, and the second LED 41 emits red light. Each of the first LED 39 and the second LED 41 is driven and controlled by the processor 33 so as to light up or blink. The drive control of lighting or blinking of the first LED 39 and the second LED 41 will be described later with reference to FIG. 6.

The inclination sensor 43 is, for example, a device that detects the inclination of the camera housing 13, which is installed to enable imaging of the area of the imaging target, based on the values of the pitch and the roll, in a case where the inclination sensor 43 is implemented by a gyro sensor. The pitch refers to a direction of vertical oscillation. The roll refers to a direction of horizontal oscillation. The inclination sensor 43 uses, for example, a characteristic that when a rotational angular velocity is applied to an object, a Coriolis force is generated in a direction perpendicular to the displacement of the object. The inclination sensor 43 can detect moving motion information of the pitch (vertical oscillation direction) and the roll (horizontal oscillation direction) by detecting the Coriolis force as an electric signal by a piezoelectric ceramic. The inclination sensor 43 may be implemented by an acceleration sensor capable of detecting the inclination of the camera housing 13 by detecting an acceleration value in each of three axial directions (for example, a horizontal direction, a height direction, and a thickness direction) of the camera housing 13, instead of the gyro sensor. In any case, the displacement information of the pitch and the roll detected by the inclination sensor 43 is stored in the storage unit 35 by the processor 33.

The power supply unit 45 holds a rechargeable battery capable of supplying power to each unit of the camera device 11. In addition, the power supply unit 45 may be supplied with power from a PoE (power of Ethernet (registered trademark)) via a wired LAN (local area network) connection of the wired communication unit 47 or a USB (universal serial bus) connection via the external interface 53.

The wired communication unit 47 is implemented by a communication device that is connected to an external device such as a PC via a communication network using a wired LAN so as to be capable of wired communication. The wired communication unit 47 transmits and receives data to and from the external device. The wired communication unit 47 may be omitted as the configuration of the camera device 11. The wired communication unit 47 may transmit, for example, the video data or the audio data received from the processor 33 to the external device described above, or may transmit data transmitted from the external device (see the above description) to the processor 33.

The video processing unit 49 is configured using a signal processing circuit that performs various types of signal processing such as white balance correction, gamma correction, edge enhancement, and color correction on the video data transmitted from the processor 33, and transmits the video data after the signal processing to the processor 33. The transmitted video data is stored in the storage unit 35 by the processor 33. As described above, the video processing unit 49 may read a learned model acquired in advance by the learning processing from the storage unit 35 and execute processing (for example, detection processing of a person or a face thereof in image data) by artificial intelligence (AI). The processing result is stored, for example, in the storage unit 35 via the processor 33.

The wireless communication unit 51 is implemented by a communication device that is wirelessly communicably connected to a setting terminal 55 (for example, a setting terminal 55) that can be carried by an operator who performs a work of installing the camera device 11. The wireless communication unit 51 transmits and receives data to and from the setting terminal 55, for example, when an operator installs the camera device 11.

The external interface 53 includes a connector capable of, for example, USB connection. An external device can be connected to the external interface 53 via a USB connector. In addition, a wireless device including the USB connector may be directly connected to the external interface 53. For the wireless communication by the wireless device, for example, Wi-Fi (registered trademark) and the like can be used.

Next, a camera angle adjustment method and a camera angle shift notification method of the camera device 11 will be described.

[Camera Angle Adjustment Method]

Figure 3:
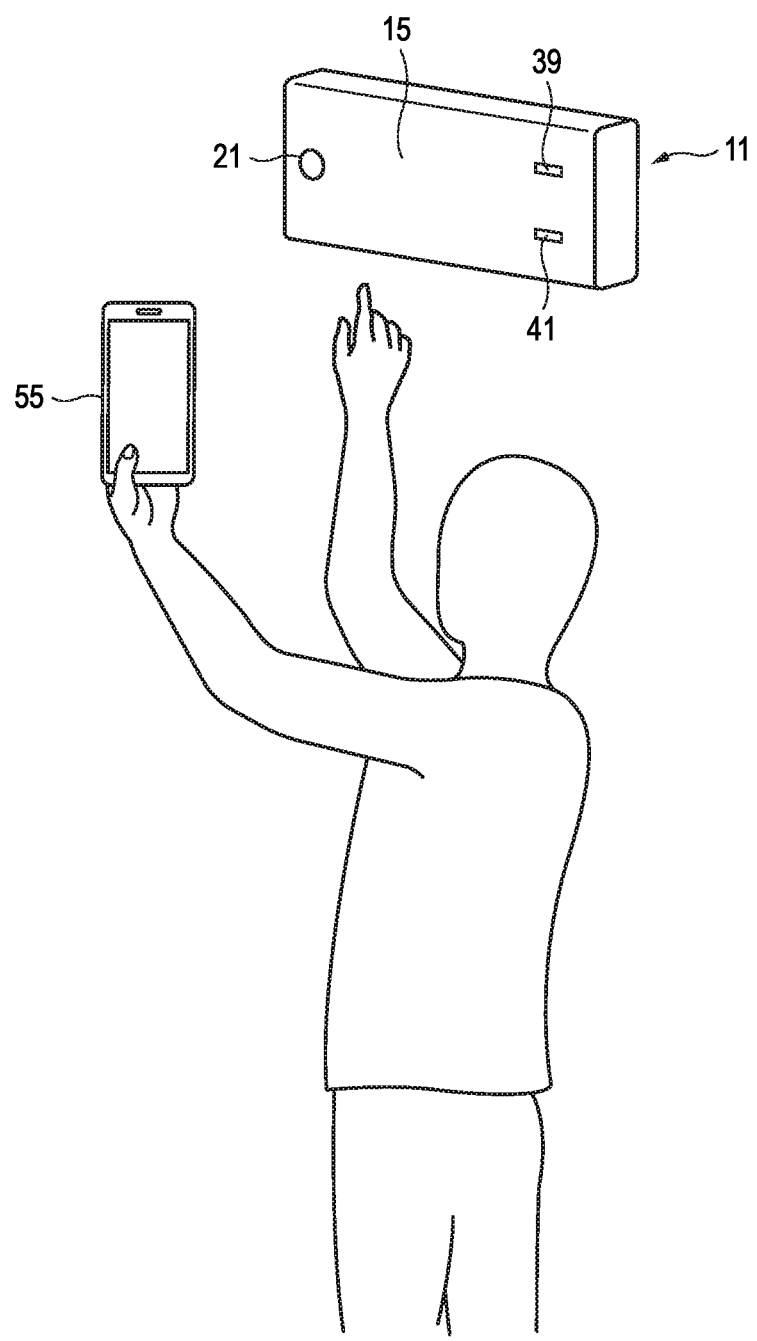
FIG. 3 is an explanatory diagram showing a situation when the camera device is installed.
Figure 4:
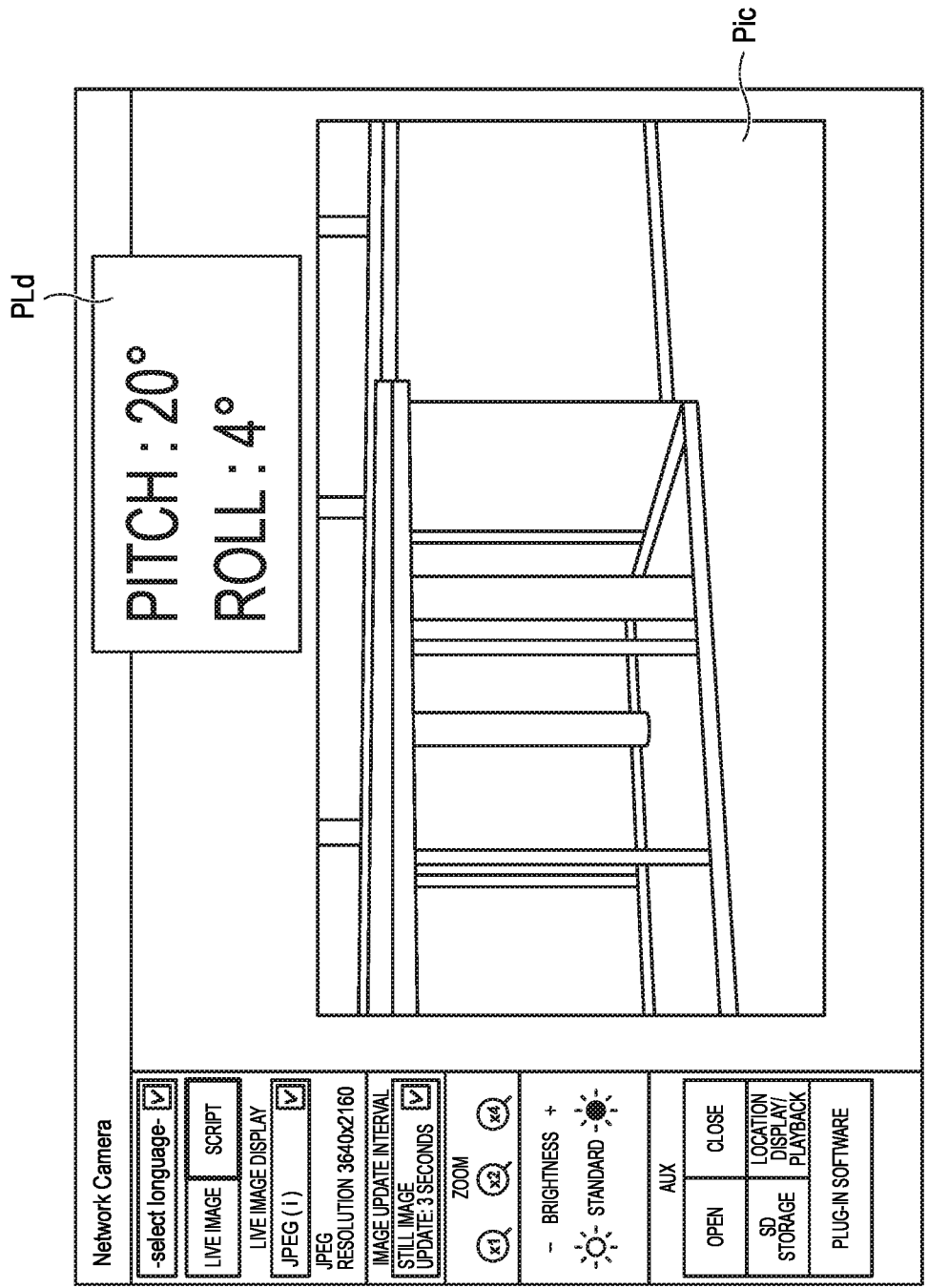
FIG. 4 is an explanatory diagram showing an example of a setting screen displayed on a setting terminal.

First, the camera angle adjustment method will be described with reference to FIGS. 3 and 4. FIG. 3 is an explanatory diagram showing a situation when the camera device 11 is installed. FIG. 4 is an explanatory diagram showing an example of a setting screen displayed on the setting terminal 55.

An operator who performs the work of installing the camera device 11 wirelessly connects the setting terminal 55 carried by the operator and the camera device 11 so as to be able to perform data communication with each other at an installation place. That is, the operator can perform the camera angle adjustment, which is performed at the time of initial installation of the camera device 11 or at the time of periodic maintenance (hereinafter, abbreviated as "at the time of installation"), by one person while viewing the setting screen (see FIG. 4) displayed on a display of the setting terminal 55.

At the time of installation of the camera device 11, the setting screen displayed on the display of the setting terminal 55 is provided with a display area of video data Pic captured by the camera device 11. In addition to the video data Pic captured by the camera device 11, current inclination information PLd (for example, a detection value of the pitch and a detection value of the roll) of the camera housing 13 acquired by the inclination sensor 43 provided in the camera housing 13 is simultaneously displayed on the setting screen. The inclination information PLd is displayed in real time each time the inclination of the camera housing 13 is detected by the inclination sensor 43 while the camera device 11 and the setting terminal 55 are wirelessly connected.

The operator holds the camera housing 13 while viewing the video data Pic captured by the camera device 11, and adjusts the camera angle of the camera device 11 to be captured. When an optimum camera angle is determined by the determination of the operator who views the video data Pic, the operator presses a camera angle registration button (not shown) in the setting screen together with the video data Pic displayed on the display of the setting terminal 55. Accordingly, operation information (camera angle registration signal) from the setting terminal 55 based on the pressing operation of the camera angle registration button is transmitted to the processor 33 of the camera device 11 via the wireless communication unit 51. Upon receiving the camera angle registration signal transmitted from the setting terminal 55, the processor 33 causes the storage unit 35 to store, as the initial value DataX, the detection value (for example, the pitch and the roll) detected by the inclination sensor 43 when the camera angle registration button is pressed. Accordingly, the camera device 11 can store, as an initial value, the detection value of the inclination sensor 43 at the time of installation of the camera housing 13 into the storage unit 35. After the processing of the camera angle adjustment method is executed, the processing of the camera angle shift notification method described with reference to FIG. 5 is executed.

[Camera Angle Shift Notification Method]

Figure 5:
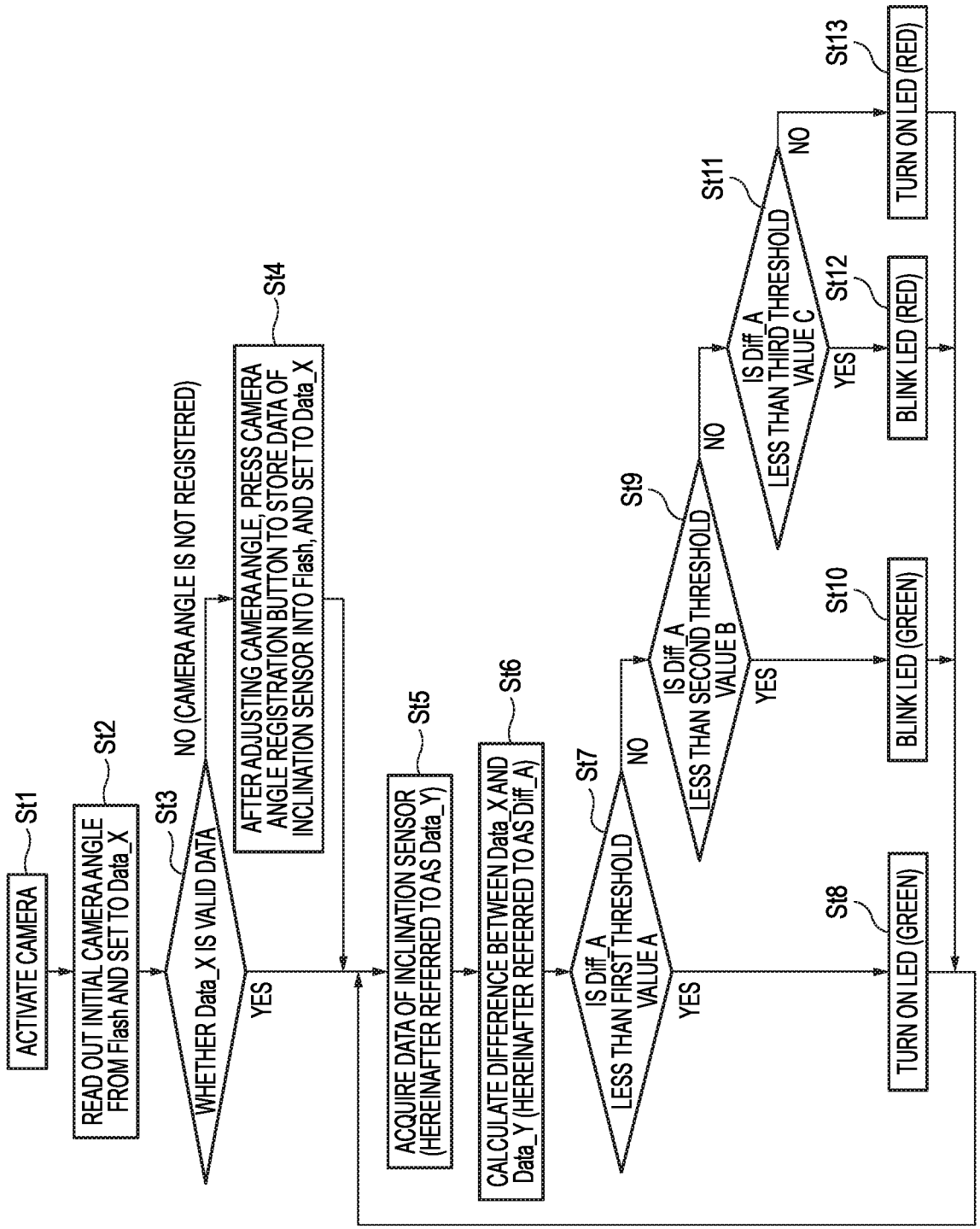
FIG. 5 is a flowchart showing an operation procedure example of a camera angle shift notification method executed by the camera device shown in FIG. 1.

FIG. 5 is a flowchart showing an operation procedure example of the camera angle shift notification method executed by the camera device 11 shown in FIG. 1. Each processing shown in FIG. 5 is mainly executed by the processor 33 of the camera device 11. The following operation procedure may be executed, for example, at the time of initial installation in which the camera device 11 is newly installed, or may be executed when the camera device 11 itself is replaced with a new one at the time of periodic maintenance (for example, at the time of cleaning or relocation).

In FIG. 5, when the camera device 11 is activated by receiving power supply from the power supply unit 45 (St1), the processor 33 reads out, from the storage unit 35, the initial value DataX which is the detection value of the inclination sensor 43 stored during the adjustment of the camera angle (St2).

The processor 33 determines whether the initial value DataX is valid data (for example, whether the initial value DataX is data already registered in the storage unit 35 by the processing of the camera angle adjustment method) (St3). When the initial value DataX is unregistered (St3, NO), the camera angle registration button is pressed after the processing of the camera angle adjustment method is performed by the operator as described above, and thus the processor 33 sets, as the initial value DataX, the detection value of the inclination sensor 43 at the time of the pressing operation (St4).

When the initial value DataX is already registered (St3, YES) or after step St4, the processor 33 acquires data of a current detection value of the inclination sensor 43 (St5). The processor 33 stores the acquired data of the detection value as the detection value DataY into the storage unit 35 for comparison processing to be described later (St5). The processor 33 calculates a difference DiffA between the detection value DataY and the initial value DataX (that is, detection value DataY−initial value DataX) and stores the difference DiffA into the storage unit 35 (St6).

As described above, the camera device 11 stores the first threshold value A, the second threshold value B, and the third threshold value C that sequentially increase into the storage unit 35 (first threshold value A<second threshold value B<third threshold value C). The camera device 11 performs drive control in different light emission patterns using a plurality of LEDs (for example, the first LED 39 and the second LED 41) according to the difference DiffA calculated in step St6 (see FIG. 6).

Here, the light emission patterns will be described with reference to FIG. 6. FIG. 6 is an explanatory diagram showing an example of the light emission patterns of the plurality of LEDs. The processor 33 determines whether the difference DiffA calculated in step St6 is less than the first threshold value A (St7). When it is determined that the difference DiffA calculated in step St6 is less than the first threshold value A (St7, YES), the processor 33 drives and controls the first LED 39 to light (St8). Accordingly, in the camera device 11, the first LED 39 lights in green. That is, for example, a store clerk who regularly looks around the situation of the camera device 11 disposed in a store can easily grasp that there is almost no shift in the camera angle at the current time point due to the green lighting state.

When it is determined that the difference DiffA calculated in step St6 is equal to or larger than the first threshold value A (St7, NO), the processor 33 determines whether the difference DiffA is less than the second threshold value B (St9). When it is determined that the difference DiffA calculated in step St6 is less than the second threshold value B (St9, YES), the processor 33 drives and controls the first LED 39 to blink (St10). Accordingly, in the camera device 11, the first LED 39 blinks in green. That is, for example, a store clerk who regularly looks around the situation of the camera device 11 disposed in a store can easily grasp that there is slight shift in the camera angle at the current time point due to the green blinking state, but there is no concern about the shift.

When it is determined that the difference DiffA calculated in step St6 is equal to or larger than the second threshold value B (St9, NO), the processor 33 determines whether the difference DiffA is less than the third threshold value C (St11). When it is determined that the difference DiffA calculated in step St6 is less than the third threshold value C (St11, YES), the processor 33 drives and controls the second LED 41 to blink (St12). Accordingly, in the camera device 11, the second LED 41 blinks in red. That is, for example, a store clerk who regularly looks around the situation of the camera device 11 disposed in a store can easily grasp that it is necessary to adjust the camera angle since there is shift in the camera angle at the current time point due to the red blinking state.

When it is determined that the difference DiffA calculated in step St6 is equal to or larger than the third threshold value C (St11, NO), the processor 33 drives and controls the second LED 41 to light (St13). Accordingly, in the camera device 11, the second LED 41 lights in red. That is, for example, a store clerk who regularly looks around the situation of camera device 11 disposed in a store can easily grasp that the camera device 11 needs to be detached immediately to adjust the camera angle since the shift in the camera angle is large at the current time point due to the red lighting state.

The lighting and blinking control from step St5 to step St13 based on the comparison of the difference DiffA with the first threshold value A, the second threshold value B, and the third threshold value C is loop processing by the processor 33. Therefore, the camera device 11 is in a state in which the inclination of the camera housing 13 is constantly monitored, and the presence or absence of the shift of the camera angle and the degree thereof can be intuitively notified by blinking or lighting of the LEDs in real time.

Next, a support structure included in the camera housing 13 of the camera device 11 will be described.

In a camera device 57 in the related art (see FIG. 8) in which a screw hole into which a support shaft is screwed is provided perpendicularly to a back surface when the support shaft supporting a camera housing cannot be inclined to, for example, a lower side than a horizontal direction, the optical axis 23 of the lens portion 21 provided on the front surface 15 of a camera housing 59 is in the horizontal direction. The support shaft is supported by, for example, an upper end of a standing pole 61 (see FIG. 8). Therefore, the camera device 57 in the related art cannot perform imaging in an orientation having a dip angle and an elevation angle in which the optical axis 23 is inclined toward the pole side.

Figure 7:
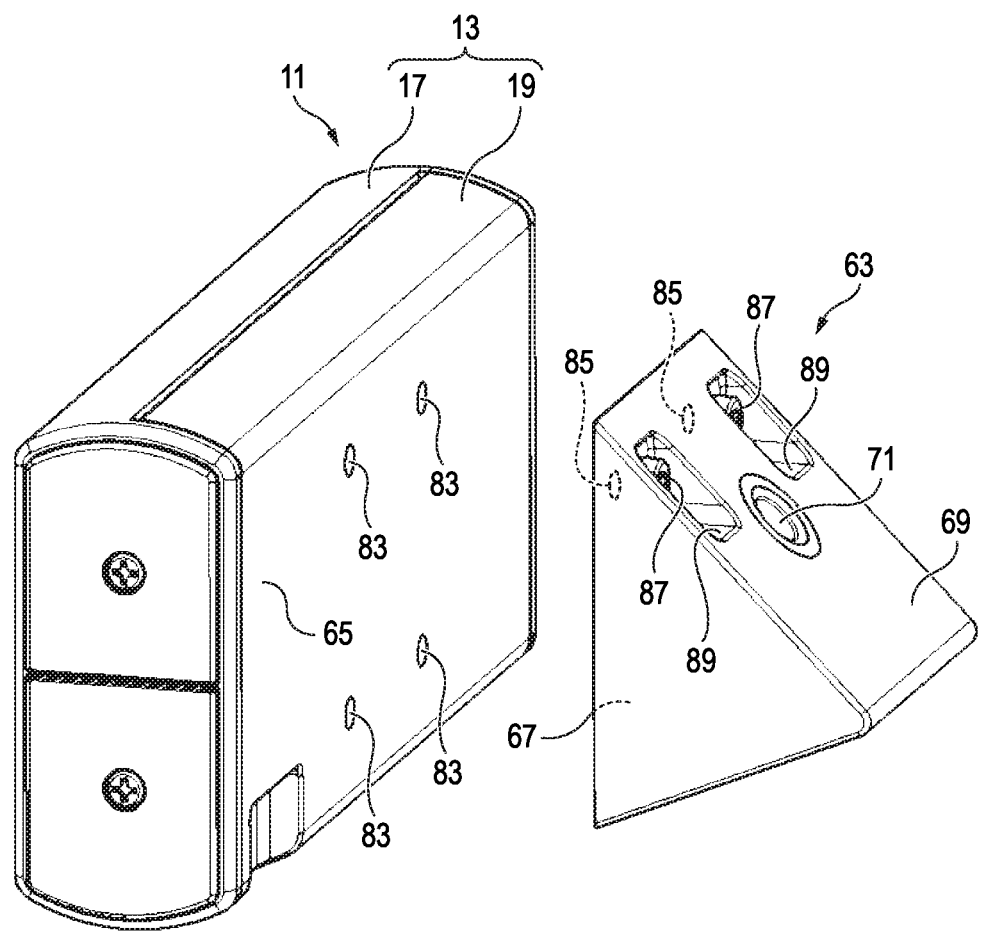
FIG. 7 is an exploded perspective view of a camera housing of a camera device 11 according to the first embodiment with an attachment detached.

FIG. 7 is an exploded perspective view of the camera housing 13 of the camera device 11 according to the first embodiment with an attachment 63 detached. The camera device 11 includes the attachment 63 as a connection component. The attachment 63 is detachably fixed to a back surface 65 of the camera housing 13. The attachment 63 is formed in, for example, a triangular prism shape. That is, in the attachment 63, side surfaces connecting three quadrangles in a ring shape are sandwiched between the front and back surfaces of a pair of parallel triangles. The pair of parallel triangles does not necessarily have to be equilateral triangles. That is, the attachment 63 does not need to be an equilateral triangular prism.

The attachment 63 has a quadrangular first side surface 67 fixed to the back surface 65 of the camera housing 13. In the attachment 63, a vertical screw hole 71 is formed in a quadrangular second side surface 69. The screw hole 71 is, for example, an inch-screw camera screw. A support shaft 73 (see FIG. 9) that moves in the inclination direction of the pitch and the roll can be screwed into the screw hole 71.

The support shaft 73 is supported by the pole 61 and the like via, for example, a ball joint 75 which is movable in the inclination direction of the pitch and the roll. The ball joint 75 can fix and release the support shaft 73 by rotating a fixing lever 77. The pole 61 including the ball joint 75 may be further fixed to an adherend 79 (see FIGS. 13 and 14) such as a shelf disposed in a store via a fixing flange 81 and the like. The shelf referred to herein may be, for example, a commodity shelf on which commodities (sales products) handled in a store are displayed, or may be a shelf used for other purposes.

In the camera device 11, four bolt fixing holes 83 are provided in the back surface 65 at positions corresponding to the respective corner portions of the square. On the other hand, the second side surface 69 of the attachment 63 is formed with a pair of through holes 85 communicating with any two adjacent bolt fixing holes 83 among the four bolt fixing holes 83. Each of the through holes 85 is formed such that a seating surface that comes into contact with a head portion of an inserted fixing bolt 87 is parallel to the back surface 65 of the camera housing 13. In the vicinity of an opening of the through hole 85, a V-shaped recess portion 89 is formed by carving the inclined second side surface 69 parallel to the back surface 65 such that the head portion of the fixing bolt 87 can be accommodated. As the fixing bolt 87, for example, a hexagon socket bolt, which is easily fastened in the recess portion 89, is preferably used.

The camera housing 13 can be fixed by directly screwing the fixing bolt 87 penetrating the adherend 79 to the back surface 65 without using the attachment 63 and the support shaft 73.

The attachment 63 is screwed to the back surface 65 by screwing a pair of fixing bolts 87 inserted into the pair of through holes 85 into any two adjacent bolt fixing holes 83 among the four bolt fixing holes 83. That is, the attachment 63 can be attached to the back surface 65 in four different postures (orientations) at every 90 degrees around a rotation center perpendicular to the back surface 65.

Figure 8:
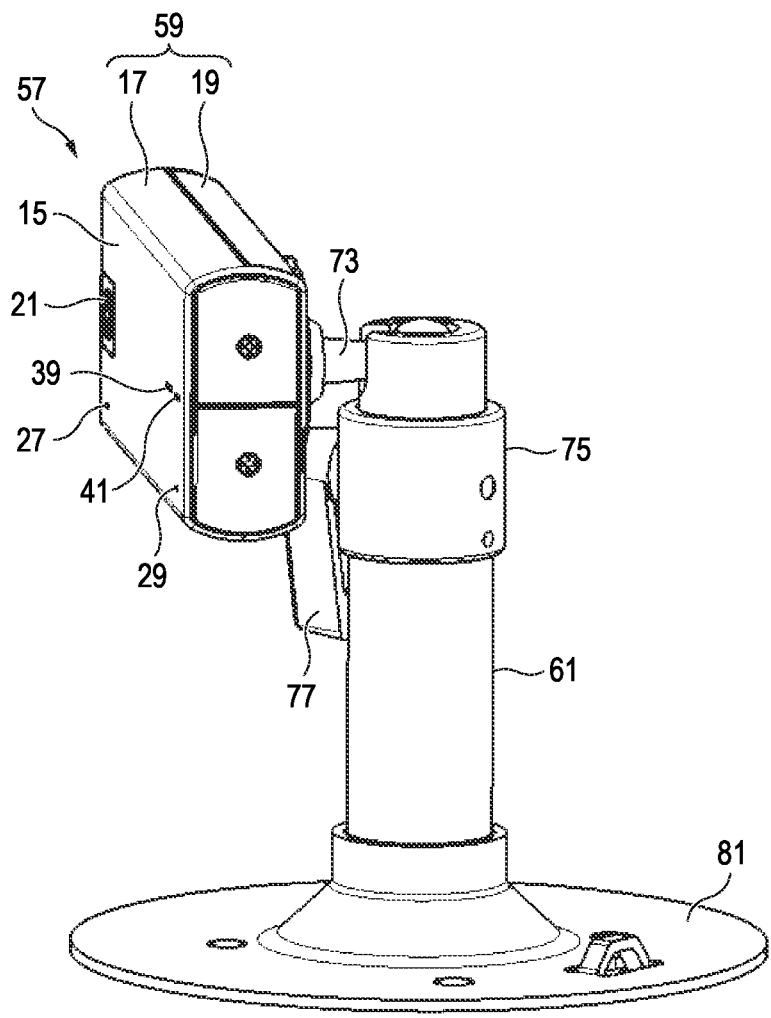
FIG. 8 is a perspective view of a camera device according to a comparative example, which is horizontally long and is supported in a standing posture, as viewed from above a side portion.

FIG. 8 is a perspective view of the camera device 57 according to a comparative example, which is horizontally long and is supported in a standing posture, as viewed from above a side portion. In the camera device 57 in the related art having no attachment 63, the support shaft 73 is screwed into the bolt fixing hole 83 formed perpendicularly to the back surface 65. In the camera device 57, when the support shaft 73 is not directed to the lower side than the horizontal direction, the optical axis 23 of the lens portion 21 is not directed to the lower side than the horizontal direction.

Figure 9:
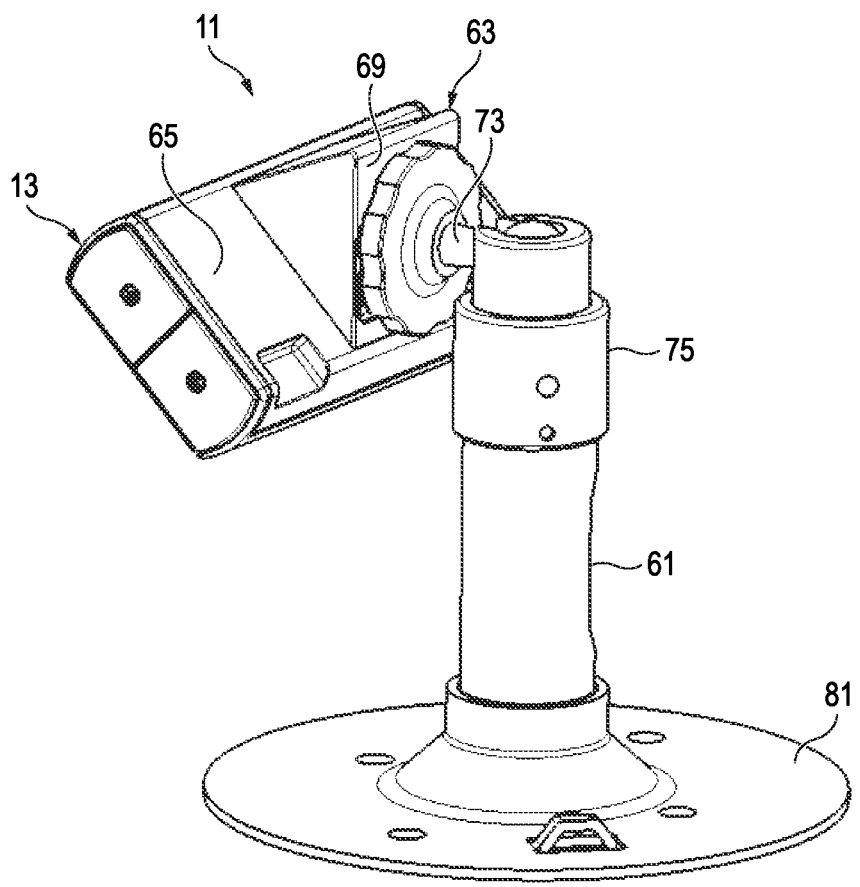
FIG. 9 is a perspective view of the camera device, which is horizontally long and is supported in a standing posture, as viewed obliquely from the rear.
Figure 10:
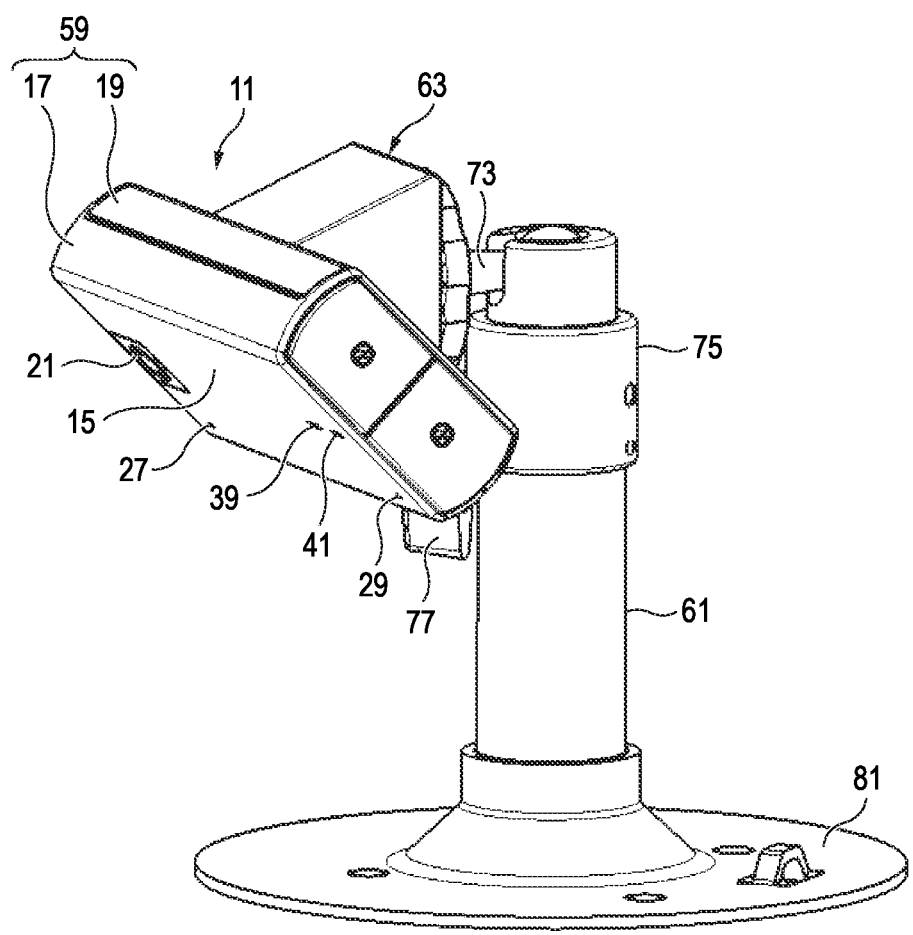
FIG. 10 is a perspective view of the camera device, which is horizontally long and is supported in a standing posture, as viewed obliquely from the front.

FIG. 9 is a perspective view of the camera device 11, which is horizontally long and is supported in a standing posture, as viewed obliquely from the rear. FIG. 10 is a perspective view of the camera device 11, which is horizontally long and is supported in a standing posture, as viewed obliquely from the front. In camera device 11 according to the first embodiment, the attachment 63 is attached to the back surface 65. The support shaft 73 is screwed to the second side surface 69 of the attachment 63 in the vertical direction. Accordingly, in the camera device 11, similarly to the above, even when the support shaft 73 is not directed to the lower side than the horizontal direction, the optical axis 23 of the lens portion 21 can be inclined to the lower side than the horizontal direction. That is, in the camera device 11 which is horizontally long and is supported in the standing posture, the optical axis 23 of the lens portion 21 can be inclined forward.

Figure 11:
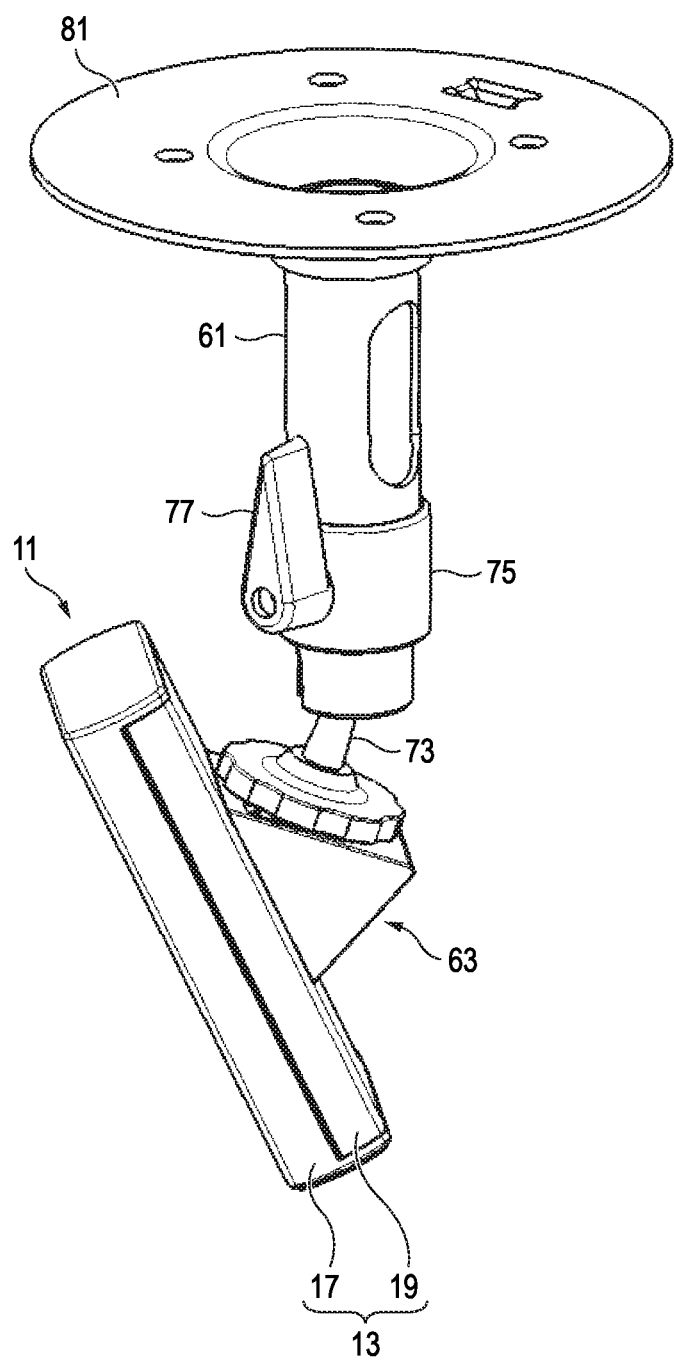
FIG. 11 is a perspective view of the camera device, which is vertically long and is supported in a suspended posture, as viewed from above a side portion.
Figure 12:
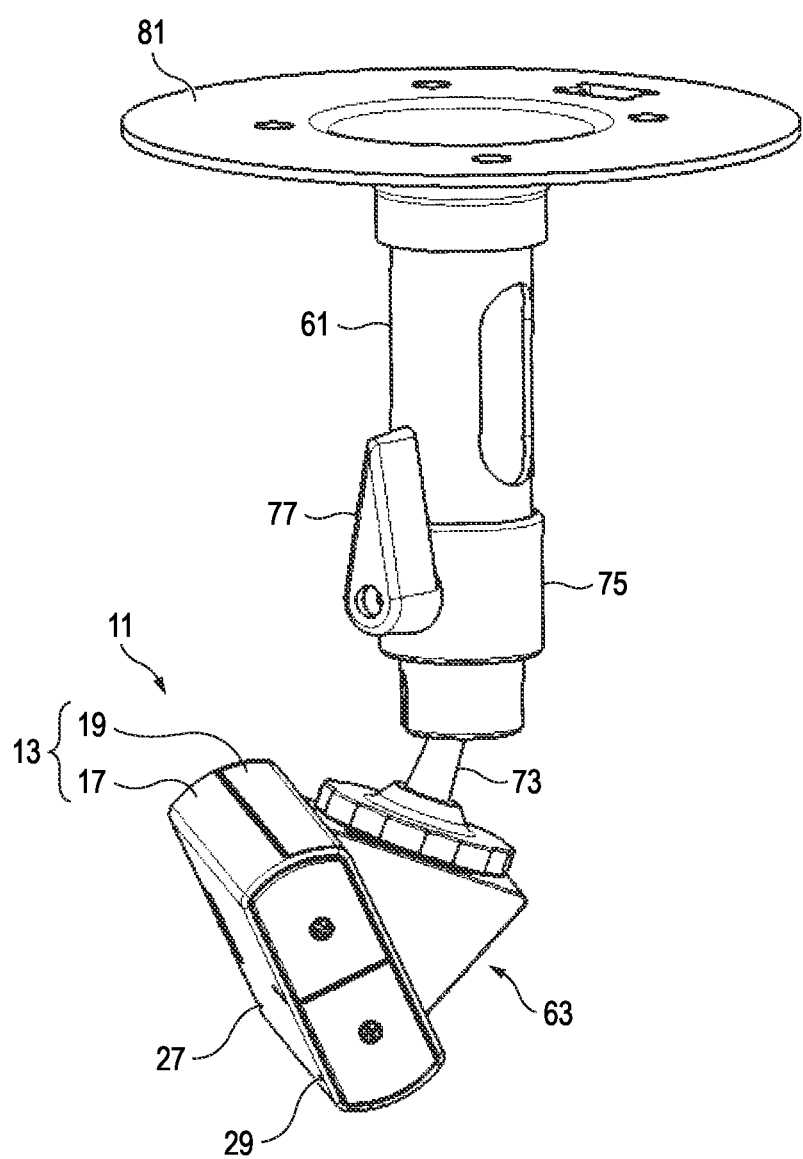
FIG. 12 is a perspective view of the camera device, which is horizontally long and is supported in a suspended posture, as viewed obliquely from the front.

FIG. 11 is a perspective view of the camera device 11, which is vertically long and is supported in a suspended posture, as viewed from above a side portion. FIG. 12 is a perspective view of the camera device 11, which is horizontally long and is supported in a suspended posture, as viewed obliquely from the front. The camera device 11 can support the rectangular camera housing 13 in a vertically long shape shown in FIG. 11 or in a horizontally long shape shown in FIG. 12 by changing a fixing orientation of the attachment 63. That is, in the camera device 11 supported in the suspended posture, the optical axis 23 of the lens portion 21 can be inclined in the direction of the elevation angle.

Next, an operation of the camera device 11 according to the first embodiment will be described.

The camera device 11 according to the first embodiment includes the inclination sensor 43 that detects the inclination of the camera housing 13, the memory (for example, the storage unit 35) that stores, as the initial value, the detection value of the inclination at the time of installation of the camera housing 13, the plurality of light emitting elements (for example, the first LED 39 and the second LED 41) provided on the front surface 15 of the camera housing 13, and the processor 33 that controls the driving of the plurality of light emitting elements. The processor 33 drives and controls the plurality of light emitting elements in different light emission patterns according to the difference between the detection value of the inclination of the camera housing 13 and the initial value.

The camera angle shift notification method according to the first embodiment is executed by the camera device 11 including the inclination sensor 43 that detects the inclination of the camera housing 13. The camera angle shift notification method includes storing, as the initial value, the detection value of the inclination at the time of installation of the camera housing 13 into the memory (for example, the storage unit 35), calculating the difference between the detection value of the inclination of the camera housing 13 and the initial value, and driving and controlling the plurality of light emitting elements (for example, LEDs) provided on the front surface of the camera housing 13 in different light emission patterns according to the difference.

When the camera housing 13 of the camera device 11 is installed, the inclination of the camera housing 13 is detected by the inclination sensor 43 provided in the camera housing 13. A detection value including the pitch and the roll detected by the inclination sensor 43 is stored in the storage unit 35 as the initial value DataX by the processor 33. On the other hand, during operation, there is a possibility that the camera housing 13 is inclined in a direction different from an imaging direction set as the initial value (for example, a customer or a hand of a cleaning person during cleaning collides with the camera housing 13 and moves). In view of such circumstances, in the camera device 11, the processor 33 periodically calculates and acquires the detection value DataY including, for example, the pitch and the roll even during the operation after the installation.

That is, the processor 33 calculates the difference DiffA between the initial value DataX which is the inclination at the time of installation and the detection value DataY which is changed by being moved thereafter, and drives and controls the plurality of LEDs in different light emission patterns based on the difference DiffA. Examples of the light emission pattern include an emission color, and lighting and blinking.

Accordingly, when the camera housing 13 is moved in a direction different from the initial value DataX during the operation (for example, during cleaning or relocation), an operator (for example, a store clerk of a store in which the camera device 11 is installed) can immediately know that the camera housing 13 has moved (that is, the camera angle has changed) by the light emission pattern of the LED.

Therefore, the operator who knows that the camera angle has changed by the light emission pattern of the LED can adjust, for example, timely correct the inclination of the camera housing 13 while viewing the light emission pattern of the LED provided on the front surface 15 of the camera housing 13. As a result of changing the inclination of the camera housing 13, when the inclination after the change is changed to an inclination close to the initial value DataX, the light emission pattern is changed. By visually recognizing the light emission pattern, the operator can know that the camera housing 13 can be adjusted in a direction approaching an original camera angle.

That is, the operator can easily restore the inclination of the camera housing 13 to the final inclination of the initial value DataX by one person by simultaneously adjusting the inclination of the camera housing 13 while visually recognizing the light emission pattern of the LED. As a result, even when the initially set camera angle is shifted, the operator can easily restore the original camera angle in a short time without directly checking a captured image, performing two-person work, or using a protractor and the like. That is, according to the camera device 11 or the camera angle shift notification method, even in a case where the camera device 11 is placed in an environment in which a camera angle for imaging is easily shifted from the time of installation, it is possible to realize early detection of shift by the operator and reduction in the time of camera angle adjustment.

In addition, in the camera device 11, the memory (for example, the storage unit 35) stores the first threshold value A, the second threshold value B larger than the first threshold value A, and the third threshold value C larger than the second threshold value B. The plurality of light emitting elements include a first light emitting element (for example, the first LED 39) and a second light emitting element (for example, the second LED 41) having different emission colors. The processor 33 drives and controls the first light emitting element (for example, the first LED 39) to light while the difference is less than the first threshold value A.

In the camera device 11, the degree of shift from the initial value DataX is stored in the storage unit 35 as the plurality of threshold values (for example, the first threshold value A, the second threshold value B, and the third threshold value C) that sequentially increase. As a guide, for example, it is indicated that the shift of the first threshold value A is small, that the shift of the second threshold value B occurs, and that the shift of the third threshold value is large. The processor 33 calculates the difference DiffA between the detection value detected by the inclination sensor 43 during the operation and the initial value DataX, and performs the drive control in different light emission patterns by using the plurality of LEDs based on the difference DiffA and the various threshold values described above.

Here, the plurality of LEDs include two of the first LED 39 and the second LED 41 having different emission colors.

The emission color of the first LED 39 is, for example, green. The emission color of the second LED 41 is, for example, red.

While the calculated difference DiffA is less than the first threshold value A, the processor 33 causes the first LED 39 to light in green. Therefore, in the camera device 11, if the camera housing 13 is not moved from an initial position, or if the camera housing 13 is slightly moved, the first LED 39 continues to light in green. In addition, if the first LED 39 lights up in green during the recovery operation, the operator can know that the recovery to the initial position is completed.

In addition, in the camera device 11, the memory (for example, the storage unit 35) stores the first threshold value A, the second threshold value B larger than the first threshold value A, and the third threshold value C larger than the second threshold value B. The plurality of light emitting elements include the first light emitting element (for example, the first LED 39) and the second light emitting element (for example, the second LED 41) having different emission colors. The processor 33 drives and controls the first light emitting element (for example, the first LED 39) to blink while the difference is equal to or larger than the first threshold value A and less than the second threshold value B.

In the camera device 11, the processor 33 causes the first LED 39 to blink in green while the difference DiffA is equal to or larger than the first threshold value A and less than the second threshold value B. Therefore, in the camera device 11, if the camera housing 13 is slightly shifted from the initial position, the first LED 39 continues to blink in green. In addition, if the first LED 39 blinks in green during the recovery operation, the operator can know that the recovery to the initial position is nearly completed.

In addition, in the camera device 11, the memory (for example, the storage unit 35) stores the first threshold value A, the second threshold value B larger than the first threshold value A, and the third threshold value C larger than the second threshold value B. The plurality of light emitting elements include the first light emitting element (for example, the first LED 39) and the second light emitting element (for example, the second LED 41) having different emission colors. The processor 33 drives and controls the second light emitting element (for example, the second LED 41) to blink while the difference is equal to or larger than the second threshold value B and less than the third threshold value C.

In the camera device 11, the processor 33 causes the second LED 41 to blink in red while the difference DiffA is equal to or larger than the second threshold value B and less than the third threshold value C. Therefore, in the camera device 11, if the camera housing 13 is shifted from the initial position, the second LED 41 continues to blink in red. In addition, if the second LED 41 blinks in red during the recovery operation, the operator can know that the camera housing 13 is still shifted from the initial position and the recovery is incomplete.

In addition, in the camera device 11, the memory (for example, the storage unit 35) stores the first threshold value A, the second threshold value B larger than the first threshold value A, and the third threshold value C larger than the second threshold value B. The plurality of light emitting elements include the first light emitting element (for example, the first LED 39) and the second light emitting element (for example, the second LED 41) having different emission colors. The processor 33 drives and controls the second LED 41 to light while the difference is equal to or larger than the third threshold value C.

In the camera device 11, the processor 33 causes the second LED 41 to light in red while the difference DiffA is equal to or larger than the third threshold value C. Therefore, in the camera device 11, if the camera housing 13 is largely shifted from the initial position, the second LED 41 continues to light in red. In addition, if the second LED 41 lights in red during the recovery operation, the operator can know that the camera housing 13 is still largely shifted from the initial position.

In addition, in the camera device 11, the camera housing 13 includes the lens portion 21 in which the optical axis 23 is perpendicular to the front surface 15. The quadrangular first side surface 67 of the triangular prism-shaped attachment 63 is fixed to the back surface 65 of the camera housing 13. The vertical screw hole 71 is formed in the quadrangular second side surface 69 of the attachment 63, and the support shaft 73 that moves in the inclination direction of the camera housing 13 is screwed into the screw hole 71.

In the camera device 11, the quadrangular first side surface 67 of the triangular prism-shaped attachment 63 is fixed to the back surface 65 of the camera housing 13. The screw hole 71 is vertically formed in the quadrangular second side surface 69 of the attachment 63. Therefore, the second side surface 69 in which the screw hole 71 is formed is inclined at an angle with respect to the back surface 65 of the camera housing 13.

The support shaft 73 that moves in the inclination direction of the pitch and the roll is screwed into the screw hole 71 of the second side surface 69. That is, the camera device 11 in which the support shaft 73 is screwed to the second side surface 69 is supported by the support shaft 73 via the attachment 63.

Figure 13:
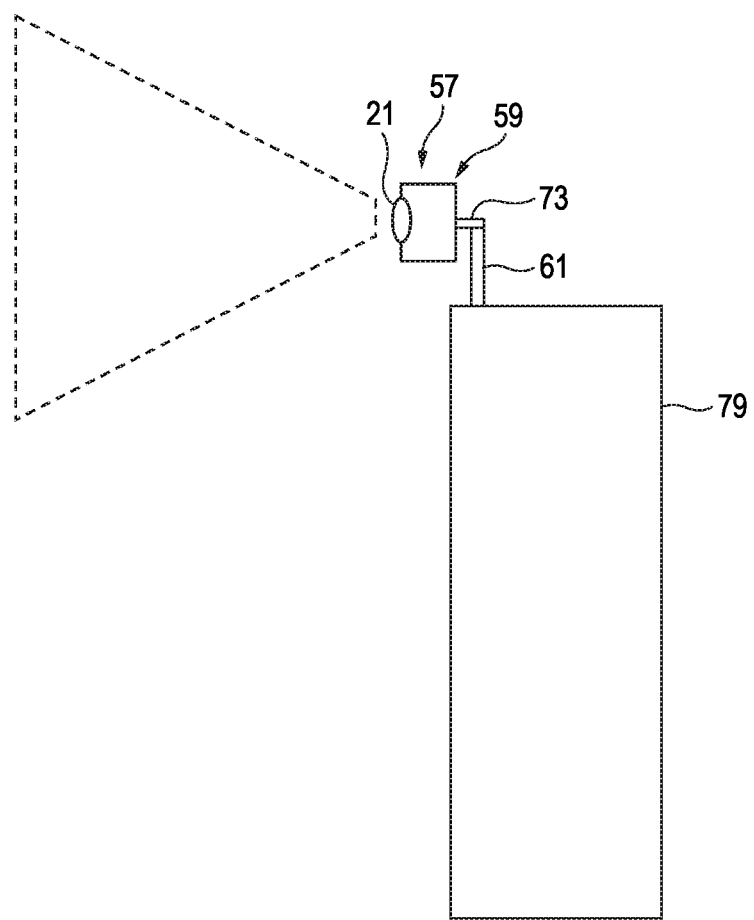
FIG. 13 is a schematic diagram showing an imaging range during operation of the camera device according to the comparative example.

FIG. 13 is a schematic diagram showing an imaging range during the operation of the camera device 57 according to the comparative example. Here, in a case where the support shaft 73 for supporting the camera housing 13 is directed in the horizontal direction, in the camera housing 59 in the related art in which the screw hole 71 perpendicular to the back surface 65 is provided, the optical axis 23 of the lens portion 21 is in the horizontal direction. In a case where the support shaft 73 cannot be inclined to the lower side than the horizontal direction, in the camera device 57, the optical axis 23 is not directed to the lower side than the horizontal direction.

Figure 14:
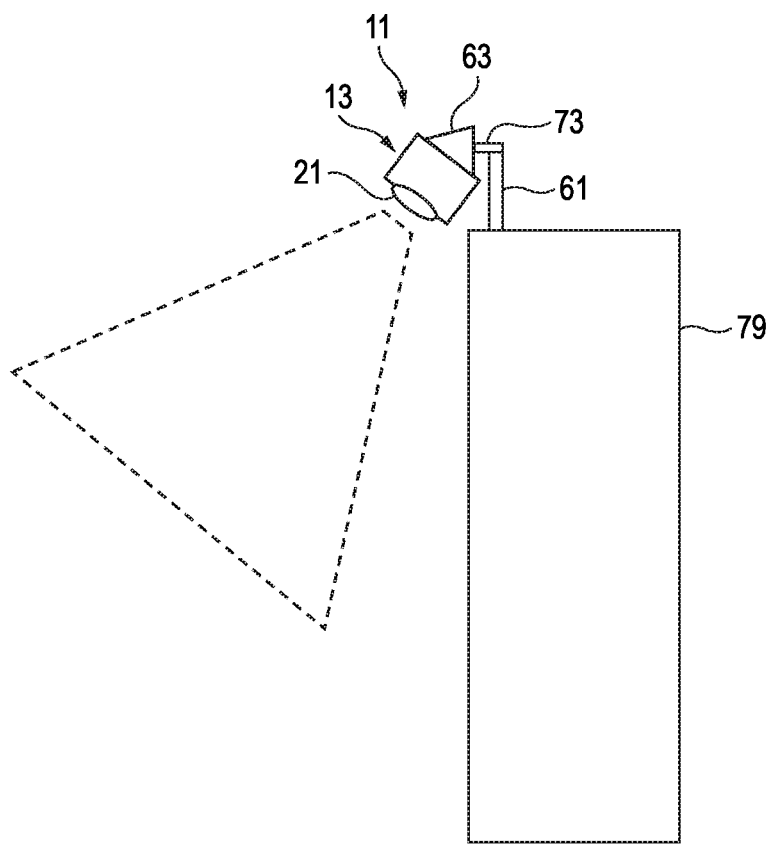
FIG. 14 is a schematic diagram showing an imaging range during operation of the camera device.

FIG. 14 is a schematic diagram showing an imaging range during the operation of the camera device 11. On the other hand, in the camera device 11 including the attachment 63 on the back surface 65, when the support shaft 73 directed in the horizontal direction is screwed to the second side surface 69 of the attachment 63, the back surface 65 of the camera housing 13 can be inclined forward with respect to the vertical surface. Accordingly, the camera device 11 can expand the imaging range to a range closer to the pole 61 supporting the support shaft 73 than the camera device 57 not having the attachment 63.

In addition, in the camera device 11, the front surface 15 of the camera housing 13 is formed in a rectangular shape. The lens portion 21 is disposed such that the optical axis 23 is offset with respect to the intersection of the pair of diagonal lines of the front surface 15. The four bolt fixing holes 83 at positions corresponding to respective corner portions of the square are provided in the back surface 65 of the camera housing 13. The pair of through holes 85 communicating with any two adjacent bolt fixing holes 83 among the four bolt fixing holes 83 are formed in the second side surface 69. The attachment 63 is screwed to the back surface 65 by screwing the pair of fixing bolts 87 respectively inserted into the pair of through holes 85 into any two adjacent bolt fixing holes 83 among the four bolt fixing holes 83.

In the camera device 11, the attachment 63 is detachably fixed to the back surface 65 of the camera housing 13 by the fixing bolt 87. Here, the camera housing 13 is formed in a rectangular shape. The lens portion 21 is disposed so as to be offset with respect to the intersection of the pair of diagonal lines of the front surface 15. For example, the lens portion 21 is disposed close to the short side of the camera housing 13.

The four bolt fixing holes 83 at positions corresponding to respective corner portions of the square are provided in the back surface 65 of the camera housing 13. On the other hand, the attachment 63 is formed with the pair of through holes 85 communicating with any two adjacent bolt fixing holes 83 among the four bolt fixing holes 83. That is, the attachment 63 can be fixed to the back surface 65 in four different orientations in which a line segment connecting the pair of through holes 85 overlaps each side of a square connecting the four bolt fixing holes 83.

Since the camera housing 13 can be fixed to the back surface 65 in four different orientations, the acquired image can be vertically long, horizontally long, and vertically reversed. Accordingly, the camera device 11 can determine the imaging range with the same degree of freedom in setting the camera angle in both cases, for example, where the camera housing 13 is supported by the pole 61 installed on the floor side and where the camera housing 13 is supported by the pole 61 installed on the ceiling side.

Although various embodiments have been described with reference to the accompanying drawings, the present disclosure is not limited to such examples. It will be apparent to those skilled in the art that various changes, modifications, substitutions, additions, deletions, and equivalents can be conceived within the scope of the claims, and it should be understood that these changes, modifications, substitutions, additions, deletions, and equivalents also belong to the technical scope of the present disclosure. In addition, constituent elements in the various embodiments described above may be arbitrarily combined within a range not departing from the gist of the invention.

INDUSTRIAL APPLICABILITY

The present disclosure is useful as a camera device and a camera angle shift notification method capable of realizing early detection of shift by an operator and reduction in time of camera angle adjustment even in a case where the camera is placed in an environment in which a camera angle for imaging is easily shifted from the time of installation.

What is claimed is:

1. A camera device comprising:
an inclination sensor that is configured to repeatedly detect an inclination of a camera housing;
a memory that stores, as an initial value, a detection value of the inclination at the time of installation of the camera housing;
a plurality of light emitting elements that is provided on a front surface of the camera housing; and
a processor that is configured to control driving of the plurality of light emitting elements, wherein
the processor is configured to drive and control the plurality of light emitting elements in different light emission patterns according to a difference between the detection value of the inclination of the camera housing and the initial value.

2. The camera device according to claim 1, wherein
the memory stores a first threshold value, a second threshold value larger than the first threshold value, and a third threshold value larger than the second threshold value,
the plurality of light emitting elements include a first light emitting element and a second light emitting element having different emission colors, and
the processor is configured to drive and control the first light emitting element to light while the difference is less than the first threshold value.

3. The camera device according to claim 1, wherein
the memory stores a first threshold value, a second threshold value larger than the first threshold value, and a third threshold value larger than the second threshold value,
the plurality of light emitting elements include a first light emitting element and a second light emitting element having different emission colors, and
the processor is configured to drive and control the first light emitting element to blink while the difference is equal to or larger than the first threshold value and less than the second threshold value.

4. The camera device according to claim 1, wherein
the memory stores a first threshold value, a second threshold value larger than the first threshold value, and a third threshold value larger than the second threshold value,
the plurality of light emitting elements include a first light emitting element and a second light emitting element having different emission colors, and
the processor is configured to drive and control the second light emitting element to blink while the difference is equal to or larger than the second threshold value and less than the third threshold value.

5. The camera device according to claim 1, wherein
the memory stores a first threshold value, a second threshold value larger than the first threshold value, and a third threshold value larger than the second threshold value,
the plurality of light emitting elements include a first light emitting element and a second light emitting element having different emission colors, and
the processor is configured to drive and control the second light emitting element to light while the difference is equal to or larger than the third threshold value.

6. The camera device according to claim 1, wherein
the camera housing has a lens portion whose optical axis is perpendicular to the front surface,
a quadrangular first side surface of a triangular prism-shaped attachment is fixed to a back surface of the camera housing,
a vertical screw hole is formed in a quadrangular second side surface of the attachment, and
a support shaft that moves in an inclination direction of the camera housing is screwed into the screw hole.

7. The camera device according to claim 6, wherein
the front surface of the camera housing is formed in a rectangular shape,
the optical axis of the lens portion is disposed offset with respect to an intersection of a pair of diagonal lines of the front surface, four bolt fixing holes are provided in the back surface at positions corresponding to respective corner portions of a square, a pair of through holes communicating with any two adjacent bolt fixing holes among the four bolt fixing holes is formed in the second side surface, and the attachment is screwed to the back surface by screwing a pair of fixing bolts respectively inserted into the pair of through holes into any two adjacent bolt fixing holes among the four bolt fixing holes.

8. A camera angle shift notification method comprising:

executing the camera angle shift notification method by a camera device including an inclination sensor that repeatedly detects an inclination of a camera housing;

storing, as an initial value, a detection value of the inclination at the time of installation of the camera housing into a memory;

calculating a difference between the detection value of the inclination of the camera housing and the initial value; and driving and controlling a plurality of light emitting elements provided on a front surface of the camera housing in different light emission patterns according to the difference.

* * * * *